United States Patent
Lampe-Juergens et al.

(10) Patent No.: US 11,454,325 B2
(45) Date of Patent: Sep. 27, 2022

(54) OVERPRESSURE PROTECTION VALVE

(71) Applicant: Honeywell International Inc., Morris Plains, NJ (US)

(72) Inventors: Christian Lampe-Juergens, Spelle (DE); August Wallmeyer, Recke (DE)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 0 days.

(21) Appl. No.: 17/095,822

(22) Filed: Nov. 12, 2020

(65) Prior Publication Data
US 2022/0146007 A1    May 12, 2022

(51) Int. Cl.
*F16K 1/46*     (2006.01)
*F16K 27/02*    (2006.01)
*F16K 17/04*    (2006.01)
*F16K 17/00*    (2006.01)

(52) U.S. Cl.
CPC .............. *F16K 1/46* (2013.01); *F16K 17/00* (2013.01); *F16K 17/0466* (2013.01); *F16K 27/02* (2013.01)

(58) Field of Classification Search
CPC .. F16K 17/0466; F16K 17/04; F16K 17/0413; F16K 17/0426; F16K 1/34; F16K 1/46; F16K 1/36; F16K 17/30; F16K 17/28; F16K 15/023; F16K 15/021; F16K 15/028; F16K 15/026; F16K 27/0209; F16K 27/02; F16J 15/32; F16J 15/3268; F16J 15/3276; F16J 15/3248; F16J 15/3252; F16J 15/166
See application file for complete search history.

(56) References Cited

U.S. PATENT DOCUMENTS

| | | | | |
|---|---|---|---|---|
| 162,773 A * | 5/1875 | Shaw | ........................ | F16K 1/46 251/357 |
| 273,284 A * | 3/1883 | Jenkins | ..................... | F16K 1/46 283/58 |
| 802,642 A * | 10/1905 | Huxley | ..................... | F16K 1/46 251/360 |
| 821,758 A * | 5/1906 | Smith | ........................ | F16K 1/46 251/368 |
| 2,918,078 A * | 12/1959 | Cummings | ............. | F16K 1/465 137/332 |
| 2,920,862 A * | 1/1960 | Beard | ........................ | F16K 1/46 251/88 |
| 3,057,372 A * | 10/1962 | Sutton | ........................ | F16K 1/46 251/332 |

(Continued)

FOREIGN PATENT DOCUMENTS

| CN | 102777611 A | 11/2012 |
|---|---|---|
| FR | 2330931 A2 * | 6/1977 |
| WO | 2019/087838 A1 | 5/2019 |

*Primary Examiner* — David Colon-Morales
(74) *Attorney, Agent, or Firm* — John Maldjian; Stevens & Lee PC

(57) ABSTRACT

In an embodiment, a system comprises a valve disc configured in an overpressure protection device. The system can also include a valve gasket configured to rest on the valve disc. The system also includes a valve seat configured above the valve gasket, wherein the valve gasket is sealed in between the valve seat and the valve disc. The system further includes a supporting structure configured above the valve seat. The supporting structure is configured to enable the valve gasket to remain in position between the valve disc and the valve seat in response to an increase in pressure.

12 Claims, 6 Drawing Sheets

(56) References Cited

U.S. PATENT DOCUMENTS

| | | | | |
|---|---|---|---|---|
| 3,070,120 | A * | 12/1962 | Wendt | F16K 1/46 |
| | | | | 251/332 |
| 3,206,158 | A * | 9/1965 | Bloomquist | F16K 31/3835 |
| | | | | 251/28 |
| 3,510,103 | A * | 5/1970 | Carsello | F16K 1/46 |
| | | | | 251/333 |
| 3,945,607 | A * | 3/1976 | Dashner | F16K 17/0486 |
| | | | | 251/360 |
| 4,923,173 | A * | 5/1990 | Szymaszek | F16K 1/36 |
| | | | | 251/356 |
| 5,186,198 | A * | 2/1993 | Kennedy | F02M 35/10236 |
| | | | | 137/71 |
| 5,984,318 | A | 11/1999 | Kojima et al. | |
| 8,523,144 | B2 * | 9/2013 | Pechtold | F16K 1/36 |
| | | | | 251/332 |
| 9,243,733 | B2 * | 1/2016 | Lively | F16K 5/00 |
| 10,378,657 | B2 * | 8/2019 | Lin | F16K 1/46 |
| 10,876,775 | B2 * | 12/2020 | Danielson | F16K 15/18 |
| 2003/0121935 | A1 | 7/2003 | Arsenault et al. | |
| 2006/0144453 | A1 * | 7/2006 | Steele | F16K 15/141 |
| | | | | 137/854 |
| 2016/0258538 | A1 | 9/2016 | Liu | |
| 2017/0350285 | A1 * | 12/2017 | Erdmann | F16K 15/033 |

\* cited by examiner

OVERPRESSURE PROTECTION VALVE

BACKGROUND

The present disclosure pertains to an overpressure protection valve to be used in meters such as, a gas meter, a fluid meter, and so forth.

DESCRIPTION OF RELATED ART

A valve, integrated into a gas meter, is intended to temporarily interrupt a gas supply in incidents including, but not limited to, non-payment, tamper attacks, safety issues such as, high temperature, high pressure, and so forth. Traditionally, the valve used in the gas meter have an operational pressure of up to 2 Pound-force per Square Inch (PSI), which makes them vulnerable in a higher pressure.

However, in case, a regulator installed upstream is broken, then a high-pressure gas that can be in a range of 10 PSI or higher, get into a low-pressure pipeline. As a result, the integrated valve is not able to withstand in a valve closed position the high pressure within the low-pressure pipeline. The high pressure can further result in an inflation of a valve gasket (made from rubber) like a balloon when the pressure rises above a level of 2 PSI. Moreover, at about 10 PSI, the valve gasket can jump off a valve disc, and the high pressure and the complete flow of the gas will go through the gas meter into a downstream installation. The high pressure and the flow of the gas into the downstream installation can further cause accidents such as, explosions and fire.

There is thus a need for an efficient long-lasting valve system and method having higher pressure resistance for gas meters or fluid meters.

SUMMARY

In an embodiment, a system comprises a valve disc configured within an overpressure protection device. The system also includes valve gasket configured over the valve disc, wherein the valve gasket is configured to rest on the valve disc. The system can also comprise a valve seat configured in the overpressure protection device. The valve gasket is configured to be sealed within the valve disc and the valve seat. The system can also comprise a supporting structure configured above the valve gasket and the valve seat. The supporting structure is configured to that the valve gasket remains in position between the valve disc and the valve seat in response to an increase in pressure.

In an embodiment, a system comprises a gas meter configured with an overpressure protection device. The system can also comprise a valve disc configured in the overpressure protection device, wherein the valve disc is configured within the gas meter. The system further comprises a valve gasket configured on the valve disc within the gas meter. The valve gasket is made of stiff plastic material to ensure that it remains in position in response to an increase in pressure. The system also comprises a valve seat configured above the valve gasket. The valve gasket is configured to press onto the valve seat in response to the increase in the pressure.

In an embodiment, a method comprises configuring a valve disc within an overpressure protection device. The method also includes positioning a valve gasket to rest above the valve disc. The valve gasket is configured to rest on the valve disc. The method also includes configuring a valve seat in the overpressure protection device. The valve gasket is configured to be sealed within the valve disc and the valve seat. The method further comprises situating a supporting structure above the valve gasket and the valve seat. The supporting structure is configured to enable the valve gasket to remain in position between the valve disc and the valve seat in response to an increase in pressure.

The preceding is a simplified summary to provide an understanding of some embodiments of the present mechanism. This summary is neither an extensive nor exhaustive overview of the present mechanism and its various embodiments. The summary presents selected concepts of the embodiments of the present mechanism in a simplified form as an introduction to the more detailed description presented below. As will be appreciated, other embodiments of the present mechanism are possible utilizing, alone or in combination, one or more of the features set forth above or described in detail below.

DESCRIPTION

This description may provide one or more illustrative and specific examples or ways of implementing the present mechanism and approach. There may be numerous other examples or ways of implementing the mechanism and approach.

The present approach may provide an overpressure protection valve having a support ring that may support a valve gasket of a valve disc from an overpressure of a gas flowing through the overpressure protection valve.

The present approach may provide an overpressure protection valve to support the valve gasket to remain in an expected assembled position.

This present mechanism has a feature in it that it may use the advantages of the prior used gas valve designs without harvesting the disadvantage.

A technical benefit is to have an overpressure protection valve that may withstand higher pressure that may be 6 times or more as compared to a conventional valve.

A technical benefit is to have an overpressure protection valve that may automatically close the valve from the meter or maybe closed remotely by the head end system in case of abnormal high pressures in the gas meter.

A business advantage is to have an overpressure protection valve in which a valve gasket is supported from a low pressure side making a seal between a valve disc and a valve seat tighter such that a pressure tolerance of the overpressure protection valve is increased by a factor of 6 times or more in sealed position.

A business advantage is to have an overpressure protection valve to tight the valve with the valve gasket support in the sealed position without any extra cost and extra parts.

The present mechanism for protecting a valve against an overpressure of a gas, comprises a support ring attached within an outlet pipe or as part of the overpressure protection valve above the valve gasket. The support ring may provide a support to a valve gasket from jumping off a valve disc due to the overpressure of the gas. The support ring may support the valve gasket to remain in expected assembled position during an overpressure of the gas. Further, the support ring may take a force from the valve gasket and the overpressure of the gas inside the valve. Next, the overpressure of the gas may support tightening of the valve disc as pressure differential is in a same direction as a closing valve disc direction. In addition, by supporting the valve gasket from a low-pressure side, the valve will remain tighter and may withstand a pressure in a range of 40 Pound-force per Square Inch (PSI) to 70 Pound-force per Square Inch (PSI), or more. Accordingly, when the pressure on the valve gasket increases, the supporting structure can ensure that the valve gasket remains in position between the valve disc and the valve seat.

Figure 1:
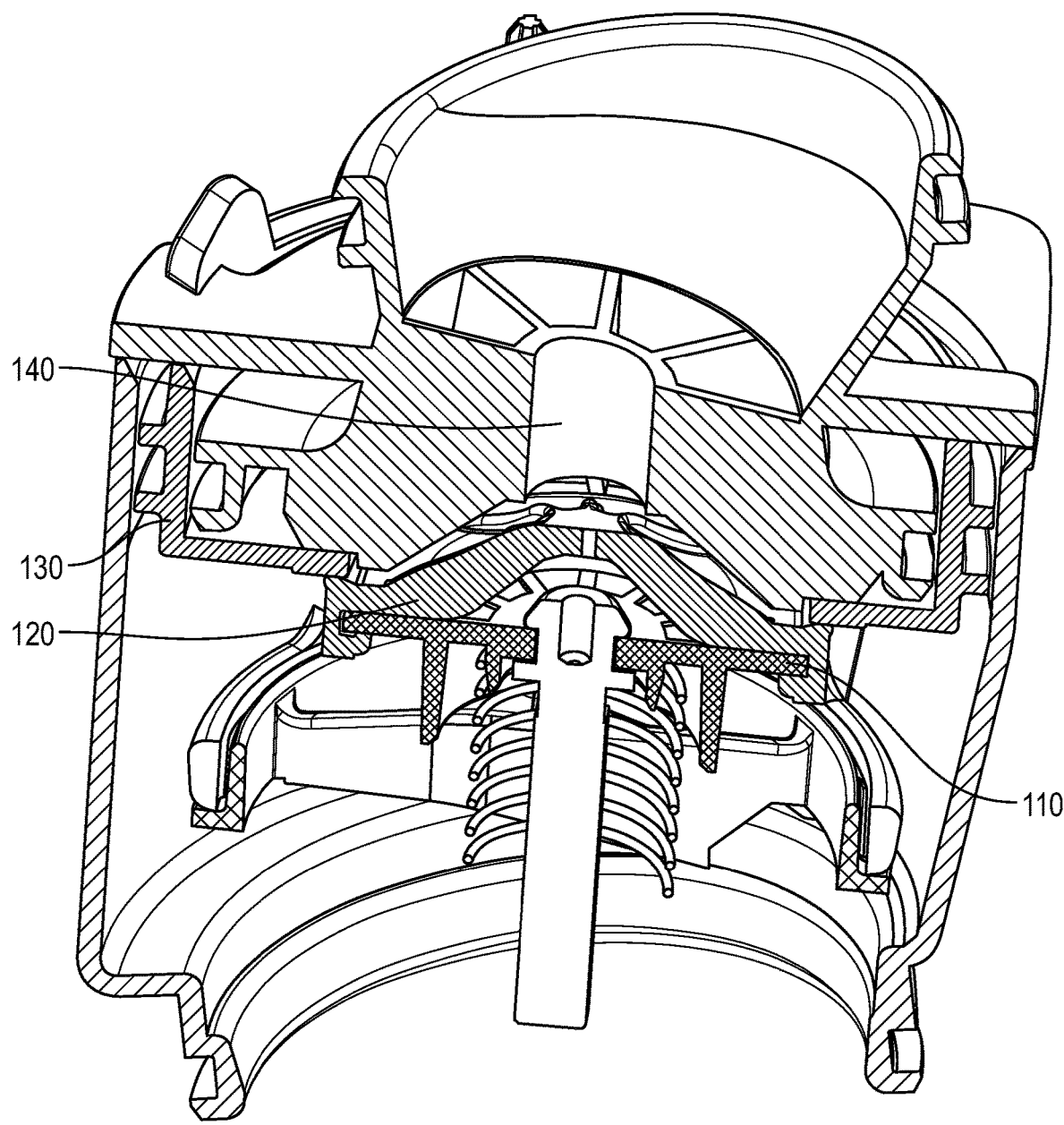
FIG. 1 is a diagram illustrating an overpressure protection valve, according to an embodiment of the present mechanism.

FIG. 1 is a diagram illustrating an overpressure protection valve 100. The overpressure protection valve 100 may be connected to or within a gas meter (not shown) or a fluid meter (not shown) for controlling a flow of a material in a gas supply net. The material may include, but not restricted to, gas, a liquified gas, a liquid, and so forth through a pipeline (not shown).

The key components of the overpressure protection valve 100 include a valve disc 110, valve gasket 120, valve seat 130, and a supporting structure 140, wherein the supporting structure 140 can be configured with a plurality of ribs.

In an embodiment of the invention, the valve gasket 120 can be made of soft rubber, and be prone to expanding when the pressure within the overpressure protection valve 100 were to increase. The valve gasket 120 can be placed over the valve disc 110, and configured on the valve disc 110. Above the valve gasket 120, the valve seat 130 can be configured.

In FIG. 1, the pressure and flow direction is equal to the valve closing direction. With rising pressure, the valve gasket 120, as it is made soft rubber, can begin to inflate or expand while being positioned between the valve disc 110 and the valve seat 130. Moreover, as the pressure continues to increase, the valve gasket 120 can continue to inflate and expand in size. As the valve gasket 120 continues to inflate in size, the valve gasket 120 can reach the point to where it can leave its original position between the valve disc 110 and the valve seat 130.

Referring to FIG. 1, as the valve gasket 120 continues to inflate due to the increase in pressure, and can potentially jump or move out of its original position between the valve seat 120 and valve disc 110 in the absence of any external force or object that can keep the valve gasket 120 in its original position. Accordingly, there is a need for the valve gasket 120 to be held in place between the valve disc 110 and the valve seat 130.

In FIG. 1, a supporting structure 140 configured within an outlet pipe within the system 100 can prevent the valve gasket 120 from moving from its original position between the valve disc 110 and the valve seat 130. The supporting structure 140 can include a plurality of ribs. Accordingly, as the valve gasket 120 continues to increase in size due to increases in pressure, the supporting structure 140 can prevent the valve gasket 120 from leaving its original position.

In FIG. 1, as the valve gasket 120 expands from a rise in pressure, the supporting structure 140 will block the valve gasket 120 from leaving it original position. The supporting structure 140 will absorb the forces form the raising pressure. Due to the supporting structure 140 absorbing the forces of the pressure, the valve gasket 120 is prevented from jumping or moving from its original position. The supporting structure 140 ensures that the valve gasket 120 remains in its original position. As a result, the overall tightness of the valve gasket 120 is improved as a result of the supporting structure 140 blocking the valve gasket 120 from leaving its position between the valve disc 110 and the valve seat 130 because of an increase in pressure.

Figure 2:
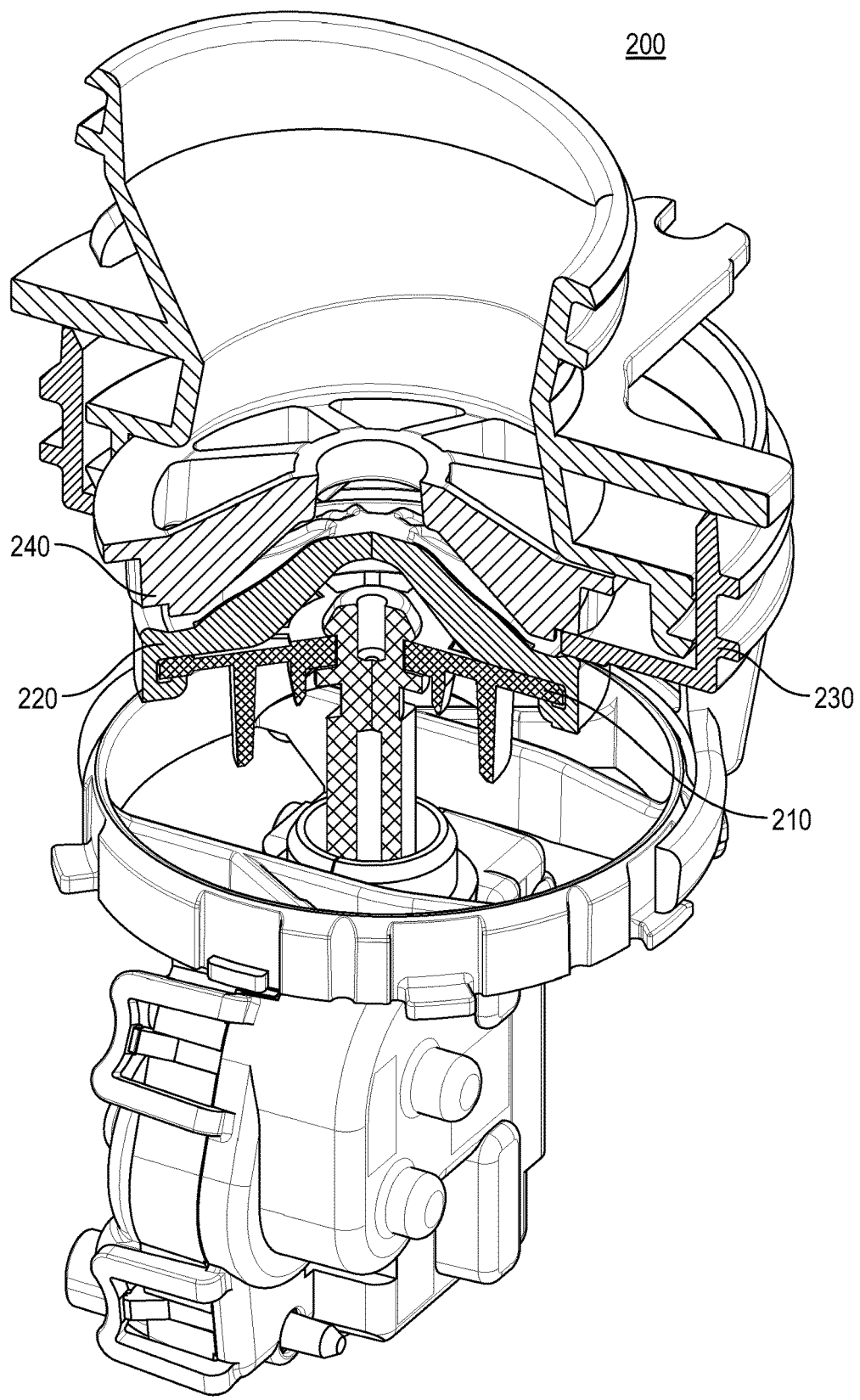
FIG. 2 is a diagram illustrating an overpressure protection valve according to another embodiment of the present mechanism.

FIG. 2 illustrates another embodiment of the present invention. FIG. 2 includes an overpressure protection device 200. The overpressure protection device 200 can include a different construction than that of FIG. 1. The overpressure protection device 200 can include a valve disc 210. A valve gasket 220 can be configured over the valve disc 210. The valve gasket 220 can be made of soft rubber. As such, the valve gasket 220 can be prone to expanding in response to an increase in pressure within the overpressure protection device 200. A valve seat 230 can be configured over the valve gasket 220. The valve gasket 220 can thereby be positioned between the valve disc 210 and the valve seat 230.

In FIG. 2, a supporting structure 240 can be configured over the valve seat 230 and also over the valve gasket 220. The supporting structure 240 can be positioned apart from the valve gasket 220 and apart from any outlet pipe within the overpressure protection device 200. As the valve gasket 220 is made of soft rubber, the valve gasket 220 can have a propensity to expand when there is an increase in pressure within the overpressure protection device 200. As the pressure continues to increase, the size of the valve gasket 220 can continue to increase. As the size of the valve gasket 220 can continue to increase, the valve gasket 220 can start to move from its original position between the valve disc 210 and the valve seat 230. Ideally, the valve gasket 230 should remain in its position between the valve disc 210 and the valve seat 230 even if there is an increase of pressure within the overpressure protection device 200. Nevertheless, as the pressure continues to increase, the size of the valve gasket 220 can continue to increase to where the valve gasket 220 can potentially move from its original position between the valve disc 210 and the valve seat 230.

Still referring to FIG. 2, the support structure 240 configured above the valve gasket 220 can ensure that the valve gasket 220 remains in its position between the valve disc 210 and the valve seat 230 when there is an increase in pressure. As the valve gasket 220 expands and begins to move from its original position, the supporting structure 240 will block the valve gasket 220 to prevent the valve gasket 220 from moving off the valve disc 210. The supporting structure 240 can absorb the forces of the rising pressure, and ensure that the valve gasket 220 will remain positioned between the valve seat 230 and the valve disc 210. The supporting structure 240 will prevent the valve gasket 220 from jumping off the valve disc 210, and an overall tightness of the valve gasket 220 can be improved at high pressures.

Figure 3:
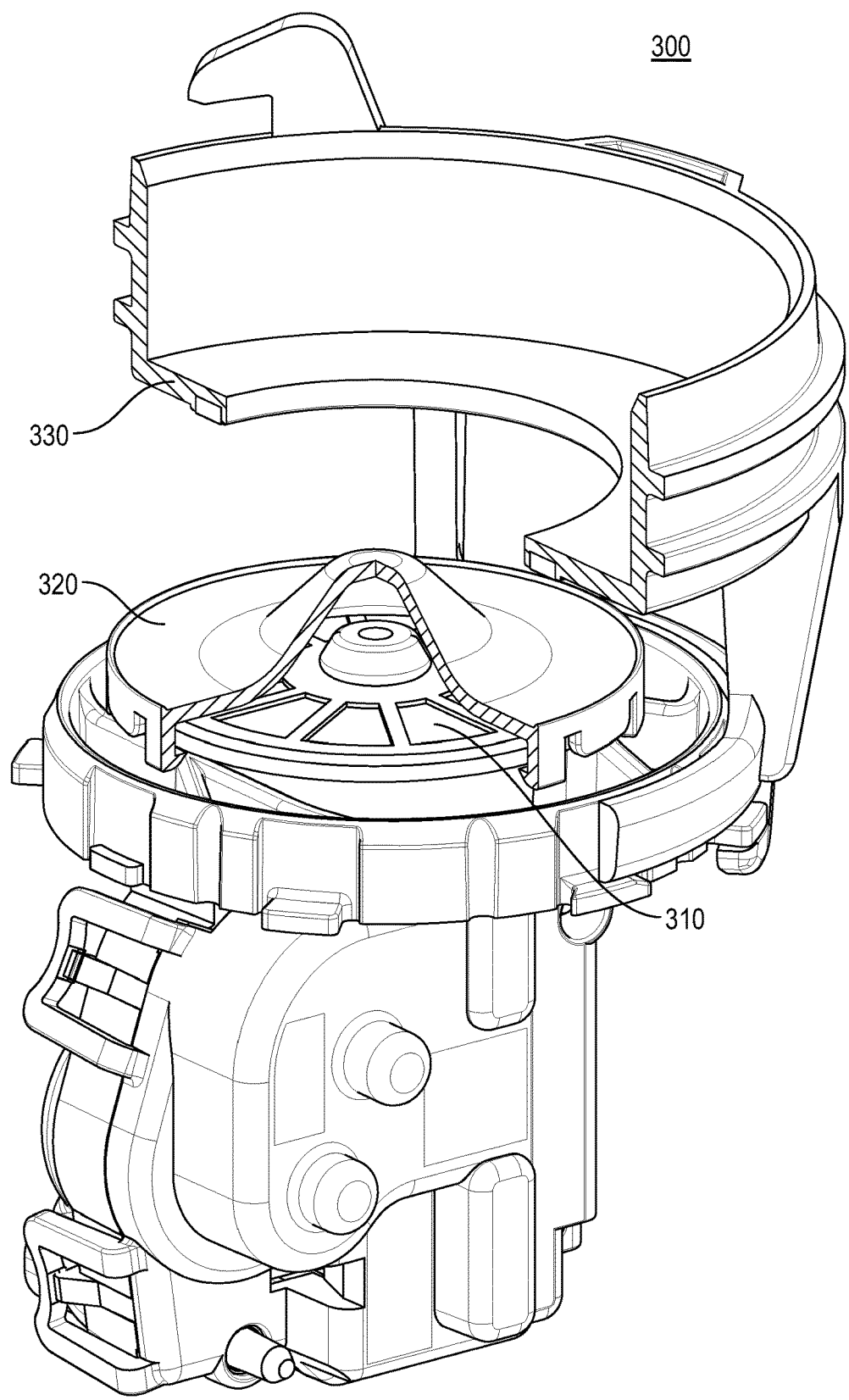
FIG. 3 is a diagram illustrating an overpressure protection valve, according to another embodiment of the present mechanism.

FIG. 3 illustrates another embodiment of the present invention. In FIG. 3, overpressure protection device 300 is shown. The overpressure protection device 300 is configured with a valve disc 310, a valve gasket 320, and a valve seat 330. Unlike the embodiments in FIGS. 1 and 2, FIG. 3 provides an illustration in which the valve gasket 320 can remain in its original position without a supporting structure to absorb the force from an increase in pressure within the overpressure protection device 300.

In FIG. 3, the valve disc 310 can comprise of a stiff plastic material. In addition, the valve gasket 320 can be configured of stiff plastic material. As the pressure increases within the overpressure protection device 300, the valve gasket 320 can begin to press onto the valve seat 330, wherein the valve seat includes a soft rubber sealing. Nevertheless, as the pressure increases, the valve gasket 320 will not begin to increase in size due to the rise in pressure. Unlike the embodiments described in FIGS. 1 and 2, the valve gasket 320 is made of stiff plastic material. Accordingly, the valve gasket 320 will not inflate due to a rise in temperature within the overpressure protection device 300. The stiff plastic material of the valve gasket 320 will prevent the valve gasket 320 from expanding due to a rise in pressure. An inflation of the valve gasket 320 is not possible due to the stiff plastic material. Further, the valve gasket 320 will be able to survive and remain in its original position between the valve disc 310 and the valve seat 330 as the pressure continues to rise in the overpressure protection device 300.

Figure 4:
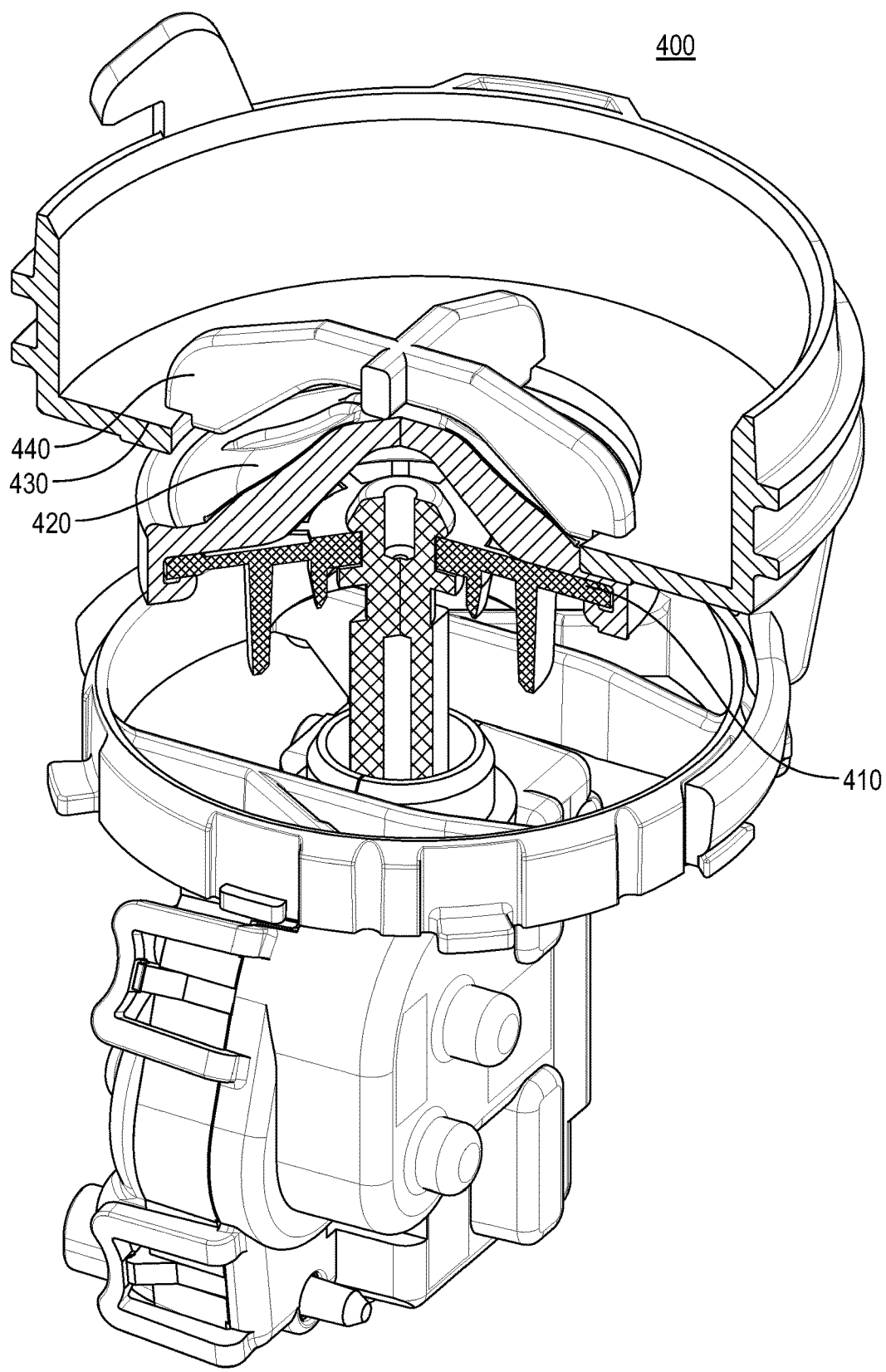
FIG. 4 illustrates an overpressure protection valve according to another embodiment of the present mechanism.

FIG. 4 illustrates another embodiment for a support structure within an overpressure protection device. In FIG. 4, another overpressure protection device 400 is illustrated. The overpressure protection device 400 can include a valve disc 410, a valve gasket 420, a valve seat 430, and a supporting structure 440.

In FIG. 4, the supporting structure 440 is a bridge like structure. The supporting structure 440 is separate from an outlet pipe within the overpressure protection device. The valve gasket 420 can be made soft rubber. Accordingly, as the pressure increases within the overpressure protection device 400, the valve gasket 420 will expand in size. As the valve gasket 420 expands in size, the valve gasket 420 can potentially leave its position between the valve disc 410 and the valve seat 430.

Referring to FIG. 4, the supporting structure 440, configured like a bridge structure with some ribs, can prevent the valve gasket 420 from moving out of its original position between the valve disc 410 and the valve seat 430. As the valve gasket 420 expands, the supporting structure 440 will block the valve gasket 420 and prevent the valve gasket 420 from moving off its original position. The supporting structure 440 will ensure that the valve gasket 420 will remain in between the valve disc 410 and the valve seat 430. Moreover, the supporting structure 440 will absorb the force of the rising pressure, which thereby enables the valve gasket 420 to remain in its original position. Moreover, an overall tightness of the valve gasket 420 can also be improved at high pressures. The supporting structure 440 with a bridge-like configuration can still provide the same support as the supporting structures described above in FIGS. 1-2.

Figure 5:
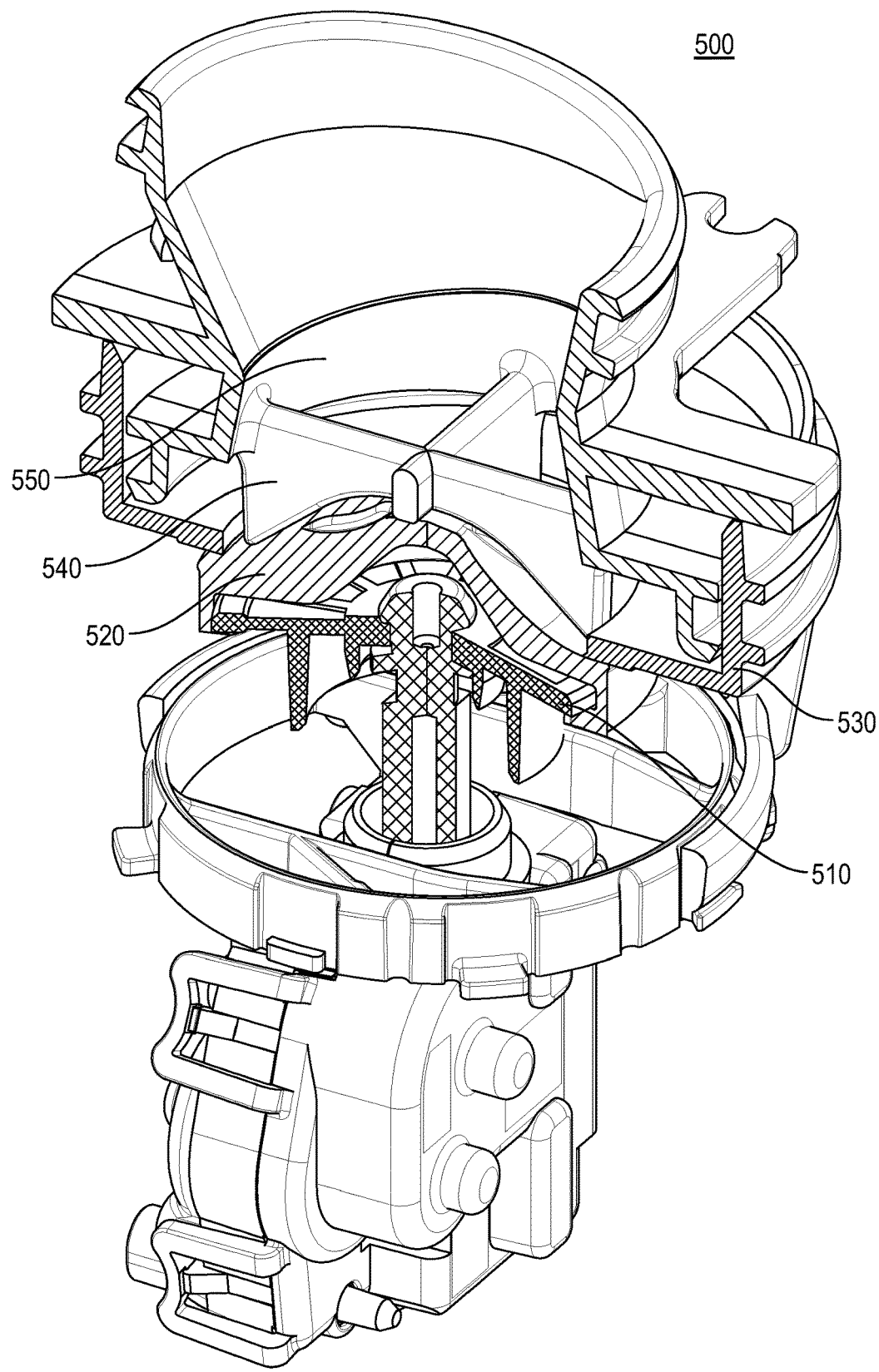
FIG. 5 illustrates an overpressure protection valve according to a further embodiment of the present mechanism.

FIG. 5 illustrates an embodiment for an overpressure protection device 500. The overpressure protection device 500 includes a valve disc 510, a valve gasket 520, a valve seat 530, a supporting structure 540, and an output pipe 550.

Referring to FIG. 5, the valve gasket 520 can be configured on the valve disc 510 and underneath the valve seat 530. As in the embodiments described in FIGS. 1, 2, 4, the valve gasket 520 is made of soft rubber. Accordingly, given that the valve gasket 520 is made of soft rubber, the size of the valve gasket 520 can expand due to an increase in pressure. Although the valve gasket 520 can originally be positioned between the valve disc 510 and the valve seat 530, the increased pressure within the overpressure protection device 500 toward the valve gasket 520 can cause the valve gasket 520 to expand in size and start to move from its original position. In addition, the increased size of the valve gasket 520 can cause the valve gasket 520 to leave its original position between the valve disc 510 and the valve seat 530.

In FIG. 5, to keep the valve gasket 520 between the valve disc 510 and the valve seat 530, a supporting structure is needed to absorb the force from the rising pressure. As such, a supporting structure 540 with a bridge-like configuration is illustrated. The supporting structure 540 has a similar bridge-like configuration to the supporting structure 440 shown in FIG. 4. However, unlike the supporting structure 440 of FIG. 4, the supporting structure 540 is attached to an outlet pipe 550.

In FIG. 5, the supporting structure 540 can block the valve gasket 520 from leaving its original position in response to the valve gasket 520 increasing in size due to rising pressure. Moreover, the supporting structure 540 can absorb the force from the rising pressure, and enable the valve gasket 520 to remain in position between the valve disc 510 and the valve seat 530. The supporting structure 520, attached to the outlet pipe 550, can continuously absorb the force from the rising pressure that causes the valve gasket 520 to increase in size. As a result, the valve gasket 520 will remain in its original position. In addition, an overall tightness of the valve gasket 520 is improved at higher pressures.

Figure 6:
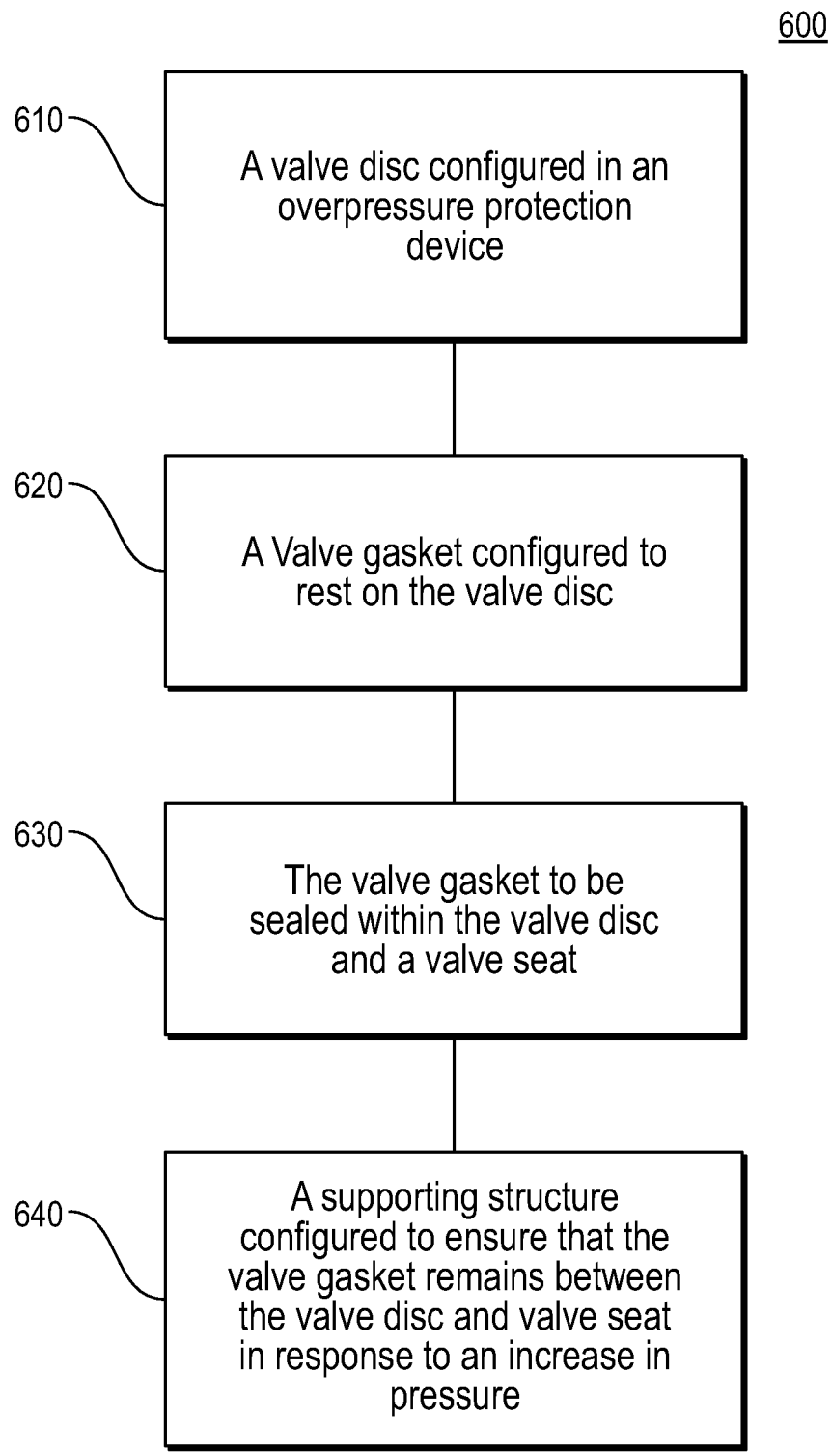
FIG. 6 illustrates a flowchart of a method for operating the overpressure protection valve, according to an embodiment of the present mechanism.

FIG. 6 illustrates a process 600 wherein a supporting structure within the overpressure protection device enables the valve gasket within the overpressure protection device to remain in its original position even when there is an increase in pressure onto the valve gasket.

In FIG. 6, at step 610, a valve disc is configured within the overpressure protection device. The valve disc is positioned to have a valve gasket be configured over it, and to provide an initial position for the valve gasket.

Referring to FIG. 6, at step 620, the valve gasket is configured on the valve disc. The original position of the valve gasket is on the valve disc. In ideal conditions, the valve gasket should remain on the valve disc even if there is a rise in pressure with the overpressure protection device.

In FIG. 6, at step 630, a valve seat is positioned above the valve gasket. The valve seat is positioned above the valve gasket to seal the valve gasket between the valve seat and the valve disc. Due to a rise in pressure, the valve gasket can begin to inflate in size. Nevertheless, inspite of the rise in pressure and the valve gasket increasing in size, the valve gasket should remain sealed between the valve disc and the valve seat. A supporting structure is needed to enable the valve gasket to remain sealed between the valve seat and the valve disc.

Referring to FIG. 6, at step 640, the supporting structure is configured above the valve gasket to enable the valve gasket to remain in position and sealed between the valve seat and the valve disc. The supporting structure will block the valve gasket from jumping off its original position between the valve disc and the valve seat. As the valve gasket can increase in size due to the rise in pressure, the supporting structure will enable the valve gasket to remain sealed between the valve seat and the valve disc. Moreover, the supporting structure will absorb the forces from the rising pressure to enable the valve gasket to remain in position. In addition, an overall tightness of the valve gasket can be improved at higher pressures.

In summary, a supporting structure described in FIGS. 1-2 and 4-6 can enable a valve gasket to remain in place when the valve gasket begins to expand in size due to rising pressures within the overpressure protection device. The supporting structure can block the valve gasket from moving from its original position between the valve seat and the valve disc by absorbing the force from the rising pressure to enable the valve gasket to remain in its original position.

In other embodiments, such as that described in FIG. 3, the valve gasket can be made of stiff plastic material as opposed to soft rubber. As a result, as the pressure increases in the overpressure protection device, the valve gasket can press more into the valve seat. The stiff plastic material will also prevent the valve gasket from increasing in size. The valve gasket will also survive at higher and increasing pressures.

Any publication or patent document that may be noted herein is hereby incorporated by reference to the same extent as if each individual publication, or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system comprising:
   a valve disc configured in an overpressure protection device;
   a valve gasket configured above the valve disc, wherein the valve gasket is configured to rest on the valve disc;
   a valve seat configured in the overpressure protection device, wherein the valve gasket is configured to be sealed within the valve disc and the valve seat; and
   a supporting structure configured above the valve seat and the valve gasket, wherein the supporting structure is configured to enable the valve gasket remains in position between the valve disc and the valve seat in response to an increase in pressure,
   wherein the supporting structure improves an overall tightness for the valve gasket when the pressure increases on the valve gasket.

2. The system of claim 1, wherein the supporting structure blocks the valve gasket from leaving its original position due to the pressure.

3. The system of claim 1, wherein the supporting structure absorbs force applied to the valve gasket due to the increase in the pressure.

4. The system of claim 1, wherein the supporting structure is configured with a plurality of ribs to keep the valve gasket in place.

5. The system of claim 1, wherein the supporting structure is configured to block movement by the valve gasket in one or more directions.

6. The system of claim 1, wherein the supporting structure ensures the valve gasket remains in between the valve disc and the valve seat in response to the valve gasket beginning to inflate in size due to the increase in the pressure.

7. A method comprising:
   configuring a valve disc within an overpressure protection device;
   positioning a valve gasket to rest above the valve disc, wherein the valve gasket is configured to rest upon the valve disc;
   configuring a valve seat in the overpressure protection device, wherein the valve gasket is configured to be sealed within the valve disc and the valve seat; and
   situating a supporting structure above the valve gasket and the valve seat, wherein the supporting structure is configured to enable the valve gasket remains in position between the valve disc and the valve seat in response to an increase in pressure,
   wherein the supporting structure improves an overall tightness for the valve gasket when the pressure increases on the valve gasket.

8. The method of claim 7, wherein the supporting structure blocks the valve gasket from inflating due to the increase in the pressure.

9. The method of claim 7, wherein the supporting structure ensures the valve gasket does not lose contact with the valve disc.

10. The method of claim 7, wherein the supporting structure is configured to absorb the applied force from the valve gasket.

11. The method of claim 7, wherein the supporting structure is configured to absorb pressure applied behind the valve gasket.

12. The method of claim 7, wherein valve gasket can withstand pressure of at least sixty pounds per square inch (PSI) due to the supporting structure.

* * * * *